(12) United States Patent
Shimizu

(10) Patent No.: US 8,466,075 B2
(45) Date of Patent: *Jun. 18, 2013

(54) OPTICAL GLASS

(75) Inventor: Koji Shimizu, Sagamihara (JP)

(73) Assignee: Kabushiki Kaisha Ohara, Kanagawa-Ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/316,777

(22) Filed: Dec. 16, 2008

(65) Prior Publication Data

US 2009/0149307 A1 Jun. 11, 2009

Related U.S. Application Data

(62) Division of application No. 11/133,500, filed on May 20, 2005.

(30) Foreign Application Priority Data

Feb. 6, 2004 (JP) ................................ 2004-164762

(51) Int. Cl.
*C03C 3/068* (2006.01)
(52) U.S. Cl.
USPC ............................................ 501/78; 501/64
(58) Field of Classification Search
USPC ............................................ 501/64, 78, 901
See application file for complete search history.

(56) References Cited

U.S. PATENT DOCUMENTS

| | | | | |
|---|---|---|---|---|
| 4,120,732 A * | 10/1978 | Komorita et al. | ............... | 501/42 |
| 4,166,746 A * | 9/1979 | Ishibashi et al. | ............... | 501/42 |
| 4,390,638 A | 6/1983 | Mennemann | | |
| 4,472,511 A * | 9/1984 | Mennemann et al. | .......... | 501/78 |
| 4,584,279 A * | 4/1986 | Grabowski et al. | ............. | 501/78 |
| 4,612,295 A * | 9/1986 | Sagara | ............................ | 501/51 |
| 4,732,876 A * | 3/1988 | Nagamine et al. | .............. | 501/78 |
| 6,187,702 B1 * | 2/2001 | Morishita | ........................ | 501/78 |
| 6,333,288 B1 | 12/2001 | Clement | | |
| 6,413,894 B1 | 7/2002 | Sato | | |
| 6,468,935 B1 | 10/2002 | Mori et al. | | |
| 6,558,316 B2 | 5/2003 | Kikuchi et al. | | |
| 6,599,852 B2 | 7/2003 | Kondo et al. | | |
| 6,645,894 B2 | 11/2003 | Endo | | |
| 6,818,578 B2 | 11/2004 | Tachiwama | | |
| 6,912,093 B2 | 6/2005 | Endo | | |
| 7,091,145 B2 | 8/2006 | Wolff et al. | | |
| 7,138,349 B2 | 11/2006 | Uehara et al. | | |
| 7,335,614 B2 | 2/2008 | Uehara et al. | | |
| 7,491,667 B2 | 2/2009 | Hayashi | | |
| 7,659,222 B2 | 2/2010 | Shimizu | | |
| 2002/0006857 A1 | 1/2002 | Tachiwama | | |
| 2003/0032542 A1 | 2/2003 | Endo | | |
| 2003/0038177 A1 | 2/2003 | Morrow | | |
| 2003/0046472 A1 | 3/2003 | Morrow | | |
| 2003/0211929 A1 | 11/2003 | Hayashi | | |
| 2004/0220041 A1 | 11/2004 | Isowaki et al. | | |
| 2004/0235638 A1 * | 11/2004 | Uehara et al. | ................... | 501/78 |
| 2005/0049135 A1 | 3/2005 | Hayashi | | |
| 2005/0107240 A1 * | 5/2005 | Uehara | .......................... | 501/78 |
| 2005/0223743 A1 | 10/2005 | Hayashi | | |
| 2006/0229186 A1 | 10/2006 | Uehara et al. | | |
| 2006/0234850 A1 | 10/2006 | Hayashi et al. | | |
| 2009/0062101 A1 | 3/2009 | Uehara | | |
| 2009/0149307 A1 | 6/2009 | Shimizu | | |

FOREIGN PATENT DOCUMENTS

| | | |
|---|---|---|
| CN | 1326904 A | 12/2001 |
| DE | 26 53 581 A1 | 6/1977 |
| EP | 1 245 544 A2 | 10/2002 |
| JP | 52 063 920 | 5/1977 |
| JP | 52-129716 A | 10/1977 |
| JP | 53-042328 B | 10/1978 |
| JP | 53-047368 B | 12/1978 |
| JP | 53-144913 | 12/1978 |
| JP | 54-2646 A | 2/1979 |
| JP | 54-006241 B | 3/1979 |
| JP | 54-6241 B | 3/1979 |
| JP | 54-6242 A | 3/1979 |
| JP | 54-090218 | 7/1979 |
| JP | 54-90218 | 7/1979 |
| JP | 54-90218 A | 7/1979 |
| JP | 60-51623 A | 3/1985 |
| JP | 60-221338 A | 11/1985 |
| JP | 62-100449 A | 5/1987 |
| JP | 4-104918 | 4/1992 |
| JP | 8-217484 A | 8/1996 |
| JP | 11-278865 | 10/1999 |
| JP | 2001-348244 A | 12/2001 |
| JP | 2002-284542 A | 10/2002 |
| JP | 2003-201142 A | 7/2003 |

(Continued)

OTHER PUBLICATIONS

Derwent Abstract 1979-08870B, Abstract of JP 53-144913 A, Dec. 16, 1978.*
JPO Office Action Dated Oct. 12, 2010.
Japanese Patent Office Action Jul. 27, 2010.
Office Action issued Jan. 19, 2007, in corresponding Chinese Patent Application 2005100742801.
Office Action issued Sep. 17, 2010, in corresponding Chinese Patent Application 201010140753.4.
Office Action issued Jul. 27, 2010, in corresponding Japanese Patent Application 2005-153792.
Notice of Examination Opinions issued Mar. 17, 2008, in corresponding Taiwan Patent Application 094118094.
Office Action issued Sep. 11, 2009, in corresponding Chinese Patent Application 200580026286.X.
Examination Report of Oct. 16, 2006, in corresponding EP Patent Application 05104258.8.
Examination Report of Jun. 8, 2009, in corresponding EP Patent Application 05104258.8.

(Continued)

*Primary Examiner* — Karl Group
*Assistant Examiner* — Elizabeth A Bolden
(74) *Attorney, Agent, or Firm* — Novak Druce Connolly Bove & Quigg, LLP

(57) ABSTRACT

An optical glass comprising $SiO_2$, $B_2O_3$ and $La_2O_3$ and one or more oxides selected from the group consisting of $ZrO_2$, $Nb_2O_5$ and $Ta_2O_5$, having a refractive index of 1.83 or over and an Abbe number of 35 or over and being free of F.

24 Claims, No Drawings

FOREIGN PATENT DOCUMENTS

| | | | |
|---|---|---|---|
| JP | 2003-252647 | A | 9/2003 |
| JP | 2003-267748 | | 9/2003 |
| JP | 2004-175632 | A | 6/2004 |
| JP | 2005-15302 | A | 1/2005 |
| JP | 2005-298262 | A | 10/2005 |
| TW | 550244 | B | 9/2003 |
| TW | 200403197 | B | 3/2004 |
| TW | I220964 | B | 9/2004 |
| TW | I228110 | B | 2/2005 |
| WO | WO2004/054937 | A1 | 7/2004 |

OTHER PUBLICATIONS

Examination Report of Aug. 24, 2011, in corresponding EP Patent Application 05104258.8.
Office Action issued Jun. 13, 2008, in corresponding U.S. Appl. No. 11/133,500.
Office Action issued Mar. 20, 2009, in corresponding U.S. Appl. No. 11/133,500.
Office Action issued Dec. 7, 2010, in corresponding Japanese Patent Application 2005-153792.
Notice of Examination Opinions issued May 29, 2008, in corresponding Taiwan Patent Application 094116923.
First Examination Refusal Decision Notice issued Dec. 30, 2008, in corresponding Taiwan Patent Application 094116923.
Office Action issued Dec. 12, 2011, in corresponding Chinese Patent Application 200710138342.X.
Office Action issued Mar. 15, 2010, in corresponding U.S. Appl. No. 11/628,043.
Office Action issued Nov. 9, 2010, in corresponding U.S. Appl. No. 11/628,043.
Written Opinion issued in corresponding PCT/JP2005/010300 dated Jul. 26, 2005.
Decision of Dismissal of Amendment mailed May 15, 2012, in corresponding Japanese Patent Application 2005-141025.
Decision of Patent Rejection mailed mailed May 15, 2012, in corresponding Japanese Patent Application 2005-141025.
Notice of Reasons for Refusal dated Jun. 21, 2012, in corresponding Taiwan Patent Application No. 097146626.
Office action issued Jun. 28, 2011 in corresponding Japanese Patent Application 2005-141025.

* cited by examiner

OPTICAL GLASS

This application is a divisional application of Ser. No. 11/133,500, filed May 20, 2005, which claims the priority of Japanese Application JP2004-164762, filed Jun. 2, 2004.

TECHNICAL FIELD

This invention relates to an optical glass which is free of F and comprises $SiO_2$, $B_2O_3$, $La_2O_3$, $Gd_2O_3$, $ZrO_2$, $Nb_2O_5$ and $Ta_2O_5$ and is capable of a very stable production.

Particularly, this invention relates to an optical glass, particularly a boro-silicate glass, which further has a particular specific gravity and liquidus temperature and is very suitable for manufacturing a glass preform.

BACKGROUND ART

It is a recent tendency to produce a lighter and smaller optical element such as a lens by utilizing an aspherical lens to reduce the number of lenses. If, however, it is attempted to produce an aspherical lens by conventional grinding and polishing, it requires an expensive and complex processing. A process, therefore, has been developed to produce a lens by directly processing a preform obtained from a gob or a glass block with a precision processed press. The lens obtained in this manner does not need grinding or polishing and, as a result, lenses can be produced at a low cost and within a short production period.

This method is called glass molding and study and development for this method have been actively made in recent years. In view of heat resisting property of a mold used for glass molding, a glass which can be softened at a lower temperature, specifically a glass having a glass transition temperature (Tg) of 630° C. or below, preferably 600° C. or below, has been sought.

On the other hand, owing to recent development of glass molding technique such as simulating a preform to a final aspherical shape of a glass after press molding or pressing a glass at a higher pressure, there has arisen possibility that a glass having a glass transition temperature (Tg) within a range from 630° C. to 670° C. can be used for glass molding. Development has also been made in material for the mold for glass molding and also a protection film for the mold and, as a result, a glass having a glass transition temperature exceeding 670° C. can be formed, by glass molding. These developments have obscured the border line between the optical glass for glass molding and general optical glasses.

Many types of optical glasses having optical constants in the vicinity of those of an optical glass which is an object of the present invention have been disclosed in the past.

Japanese Patent Publication No. Sho 53-42328, No. Sho 53-47368 and No. Sho-54-6242 and Japanese Patent Application Laid-open Publication No. 2002-284542 disclose high refractive index and low dispersion optical glasses comprising $SiO_2$, $B_2O_3$ and $La_2O_3$ as principal components. The refractive index of these optical glasses, however, is still not sufficient for the optical constants which are required for an optical glass which is an object of the present invention. These optical glasses are also not sufficient in respect of chemical durability.

Japanese Patent Application Laid-open Publication No. Sho 52-129716 discloses an optical glass having a refractive index of 1.85 or over but this optical glass is not sufficient in Abbe number.

Japanese Patent Publication No. Sho 54-6241 and Japanese Patent Application Laid-open Publication No. Sho 54-90218 disclose optical glasses comprising $B_2O_3$, $La_2O_3$, $Gd_2O_3$ and $WO_3$ as principal components and having a refractive index exceeding 1.85. These optical glasses, however, are not sufficient in stability to devitrification particularly in a region where Abbe number is 40 or over.

Japanese Patent Publication No. Sho 54-2646 discloses optical glasses having a refractive index exceeding 1.85 but these optical glasses are all insufficient in Abbe number and insufficient also in stability to devitrification.

Japanese Patent Application Laid-open Publication No. 2001-348244 discloses an optical glass having a refractive index of 1.875 or over and Abbe number of 39.5 or over. This optical glass, however, has a high liquidus temperature due mainly to insufficient amounts of $Nb_2O_5$ and $Ta_2O_5$ or a total amount of these components and hence has not sufficient capability of a large scale production. Besides, the optical glass disclosed in this publication has a high specific gravity with the result that weight of a lens made of this optical glass becomes excessively large and that flow control of the glass in a pipe is difficult in producing a glass preform by dripping the glass from the pipe made of Pt alloy.

Japanese Patent Application Laid-open Publication No. 2003-267748 discloses a high refractive index optical glass having a glass transition temperature of 630° C. or below This optical glass, however, has a high liquidus temperature due mainly to insufficient amounts of $Nb_2O_5$ and $Ta_2O_5$ or a total amount of these components and hence has not sufficient capability of a large scale production.

The above described publications also disclose examples which comprise F component. These optical glasses containing F component, however, have the disadvantage that they have high volatility of F in the melting of glass materials and this causes significant variation in the quality of the optical glass such as refractive index. These optical glasses containing F component moreover have a tendency toward deterioration in chemical durability and hence is not suitable for a large scale production.

Refractive index within a range from 1.85 to 1.90 and Abbe number within a range from 40 to 42 are often used in conventional optical glasses.

If an optical glass for press molding having optical constants within these ranges is used as an aspherical lens, correction of spherical aberration will be facilitated and an optical system of a more compact and a higher efficiency will be realized. Therefore, there is a high demand for an optical glass which has optical constants within the above described ranges and still enables a stable production as an optical glass for press molding and also for general uses.

The prior art optical glasses having optical constants within the above described ranges, however, have poor chemical durability and a high liquidus temperature and hence are not suitable for a stable commercial production.

It is, therefore, an object of the present invention to provide an optical glass which has optical constants of the above described ranges and still has a low liquidus temperature and high chemical durability.

It is another object of the invention to provide an optical glass for press molding having a low glass transition temperature.

SUMMARY OF THE INVENTION

Studies and experiments made by the inventor of the present invention for achieving the above described objects of the present invention have resulted in the finding, which has led to the present invention, that an optical glass having a specific composition and being substantially free of F has optical constants within the above described ranges and has such an excellent chemical durability that addition of alkali components does not impair durability of the glass and hence it is suitable for press molding.

The inventor of the present invention has also found that by maintaining sum of amounts of $Ta_2O_5$ and $Nb_2O_5$ above a specific value, stability to devitrification can be significantly improved while maintaining the optical constants of the glass composition at desired values.

For achieving the above described objects of the invention, in the first aspect of the invention, there is provided an optical glass comprising $SiO_2$, $B_2O_3$ and $La_2O_3$ and one or more oxides selected from the group consisting of $ZrO_2$, $Nb_2O_5$ and $Ta_2O_5$, having a refractive index of 1.83 or over and an Abbe number of 35 or over and being free of F.

In the second aspect of the invention, there is provided an optical glass as defined in the first aspect wherein liquidus temperature is 1240° C. or below.

In the third aspect of the invention, there is provided an optical glass as defined in the first aspect wherein liquidus temperature is 1140° C. or below.

In the fourth aspect of the invention, there is provided an optical glass as defined in any of the first to third aspects wherein acid-proof property of glass measured in accordance with Japanese Optical Glass Industrial Standard JOGIS $06^{-1999}$ "Measuring Method of Chemical Durability of Optical Glass (Powder Method)" is Class 2 or below.

In the fifth aspect of the invention, there is provided an optical glass as defined in any of the first to fourth aspects having a specific gravity within a range from 4.80 to 5.25.

In the sixth aspect of the invention, there is provided an optical glass as defined in any of the first to fifth aspect wherein a total amount of $Ta_2O_5+Nb_2O_5$ is 18-28%.

In the seventh aspect of the invention, there is provided an optical glass comprising, in mass % calculated on oxide basis,

| | |
|---|---|
| $SiO_2$ | 2-9% and/or |
| $B_2O_3$ | 8.0-less than 18% and/or |
| $La_2O_3$ | 33-50% and/or |
| $Gd_2O_3$ | 3-20% and/or |
| $ZrO_2$ | 4.5-7% and/or |
| $Nb_2O_5$ | 0.1-3% and/or |
| $Ta_2O_5$ | 15-25% | where a total amount of $Ta_2O_5+Nb_2O_5$ is 17-28% and

| | |
|---|---|
| $Li_2O$ | 0-3% and/or |
| $WO_3$ | 0-3% and/or |
| ZnO | 0-10% and/or |
| RO | 0-5% | where R is one or more elements selected from the group consisting of Mg, Ca, Sr and Ba and/or

| | |
|---|---|
| $Sb_2O_3$ | 0-1% | and being free of F.

In the eighth aspect of the invention, there is provided an optical glass comprising, in mass % calculated on oxide basis,

| | |
|---|---|
| $SiO_2$ | 3-9% |
| $B_2O_3$ | 9.5-less than 18% |
| $La_2O_3$ | 33-45% |
| $Gd_2O_3$ | 3-18% |
| $ZrO_2$ | 5-7% |
| $Nb_2O_5$ | 0.1-3% and |
| $Ta_2O_5$ | 15-25% | where a total amount of $Ta_2O_5+Nb_2O_5$ is 16-28% and

| | |
|---|---|
| $Li_2O$ | 0-3% and/or |
| $WO_3$ | 0-3% and/or |
| ZnO | 0-10% and/or |
| RO | 0-5% | where R is one or more elements selected from the group consisting of Mg, Ca, Sr and Ba and/or

| | |
|---|---|
| $Sb_2O_3$ | 0-1% | and being free of F.

In the ninth aspect of the invention, there is provided an optical glass as defined in the seventh or eighth aspect wherein a total amount of $Ta_2O_5+Nb_2O_5$ is 18-23%.

In the tenth aspect of the invention, there is provided an optical glass as defined in any of the seventh to ninth aspect having a refractive index within a range from 1.88 to 1.90 and comprising $WO_3$ in an amount of less than 0.5% in mass % on oxide basis.

In the eleventh aspect of the invention, there is provided an optical glass as defined in any of the seventh to ninth aspect having a refractive index within a range from 1.85 to 1.90 and Abbe number within a range from 40 to 42.

In the twelfth aspect of the invention, there is provided an optical glass as defined in any of the seventh to eleventh aspect comprising, in mass % calculated on oxide basis,

| | |
|---|---|
| $B_2O_3$ | 15-17% and |
| $Gd_2O_3$ | 3-9.5% | wherein a total amount of $Gd_2O_3+Nb_2O_5$ is less than 10%.

In the thirteenth aspect of the invention, there is provided an optical glass as defined in any of the first to twelfth aspect having a glass transition temperature (Tg) of 670° C. or below and comprising $Li_2O$ in an amount of 0.5% or over.

In the fourteenth aspect of the invention, there is provided an optical glass as defined in any of the first to thirteenth aspect having a glass transition temperature (Tg) of 630° C. or below and comprising $Li_2O$ in an amount of 0.5% or over.

In the fifteenth aspect of the invention, there is provided an glass as defined in any of the first to fourteenth aspect comprising $TiO_2$ in an amount of less than 5% and $Al_2O_3$ in an amount of less than 5%.

In the sixteenth aspect of the invention, there is provided an optical glass as defined in any of the seventh to fifteenth aspect wherein acid-proof property of glass measured in accordance with Japanese Optical Glass Industrial Standard JOGIS $06^{-1999}$ "Measuring Method of Chemical Durability of Optical Glass (Powder Method)" is Class 2 or below.

In the seventeenth aspect of the invention, there is provided an optical glass as defined in any of the seventh to fifteenth aspect wherein acid-proof property of glass measured in accordance with Japanese Optical Glass Industrial Standard JOGIS 06$^{-1999}$ "Measuring Method of Chemical Durability of Optical Glass (Powder Method)" is Class 1.

In the eighteenth aspect of the invention, there is provided an optical glass as defined in any of the seventh to seventeenth aspect wherein liquidus temperature is 1240° C. or below.

In the nineteenth aspect of the invention, there is provided an optical glass as defined in any of the seventh to seventeenth aspect wherein liquidus temperature is 1140° C. or below.

In the twentieth aspect of the invention, there is provided an optical glass as defined in any of the seventh to seventeenth aspect having a specific gravity within a range from 4.80 to 5.25.

In the twenty-first aspect of the invention, there is provided an optical glass comprising $Ta_2O_5$ and $Nb_2O_5$, being free of F and having a specific gravity within a range from 4.60 to 5.25 wherein a total amount of $Ta_2O_5$ and $Nb_2O_5$ to the total mass of the glass composition is 18-23%.

In the twenty-second aspect of the invention, there is provided an optical glass as defined in any of the first to twenty-first aspect wherein logarithm log η of viscosity η (dPa·s) at liquidus temperature is 0.3 or over.

In the twenty-third aspect of the invention, there is provided a glass preform for press molding made of an optical glass as defined in any of the first to twenty-second aspect.

In the twenty-fourth aspect of the invention, there is provided an optical element made of an optical glass as defined in any of the first to twenty-second aspect.

In the twenty-fifth aspect of the invention, there is provided an optical element formed by press molding the glass preform for press molding as defined in the twenty-third aspect.

DESCRIPTION OF PREFERRED EMBODIMENT

Description will now be made about reasons for limiting the ranges of properties of the optical glass of the present invention to the above described values.

Description will also be made about reasons for limiting the ranges of composition of the respective components of the optical glass of the invention to the above described values in mass % on oxide basis.

In the present specification, the term "comprising, calculated on oxide basis" means that, assuming that oxides, carbonates, nitrates etc. which are used as raw materials of the glass composition of the optical glass of the present invention have all been decomposed and converted to oxides during the melting process, each component of the glass comprises a particular ratio to the total weight of the converted oxides which is 100 mass %.

$SiO_2$ is a glass forming oxide and also is a component which improves chemical durability. For achieving these effects, the amount of $SiO_2$ should be 2.0% or over. If, however, the amount of this component exceeds 9.0%, there arises a case where it becomes difficult to maintain refractive index of 1.85 or over. Therefore, the lower limit of the amount of this component should preferably be 2.0%, more preferably 3.0% and, most preferably be more than 5.5% and the upper limit of the amount of this component should preferably be 9.0%, more preferably 6.7% and, most preferably be 5.7%.

$B_2O_3$ is an essential component which is indispensable as a glass forming oxide in the optical glass of the present invention which contains a large amount of rare earth oxides. If the amount of this component is less than 8.0%, this effect cannot be achieved sufficiently whereas if the amount of this component is 18% or over, chemical durability is deteriorated. Therefore, the lower limit of the amount of this component should preferably be 8.0%, more preferably 9.5% and, most preferably be 15% and the upper limit of the amount of this component should preferably be less than 18%, more preferably 17% and, most preferably be 16%.

$Li_2O$ is effective for lowering liquidus temperature and glass transition temperature (Tg). If the amount of this component exceeds 3%, the liquidus temperature rises rather than falls with resulting difficulty in glassification. For obtaining a low glass transition temperature (Tg), the lower limit of the amount of this component should preferably be 0.5%, more preferably 0.7% and more preferably be 1.0% and the upper limit of the amount of this component should preferably be 3%, more preferably 2% and, most preferably be 1.7%.

$La_2O_3$ is effective for increasing refractive index and Abbe number of the glass. If the amount of this component is less than 33%, it becomes difficult to maintain the values of the optical constants of the glass within the above described ranges whereas if the amount of this component exceeds 50%, liquidus temperature rises. For maintaining good productivity, therefore, the lower limit of the amount of this component should preferably be 33%, more preferably 35% and, most preferably be 37% and the upper limit of the amount of this component should preferably be 50%, more preferably 45% and, most preferably be less than 39%.

Like $La_2O_3$, $Gd_2O_3$ is effective for increasing refractive index and Abbe number of the glass. If the amount of this component is less than 3%, it becomes difficult to maintain the values of the optical constants of the glass within the above described ranges whereas if the amount of this component exceeds 20%, liquidus temperature rises. For maintaining good productivity, therefore, the lower limit of the amount of this component should preferably be 3%, more preferably 6.0% and, most preferably be 6.5% and the upper limit of the amount of this component should preferably be 20%, more preferably 18% and, most preferably be 9.5%.

$ZrO_2$ is effective for adjusting optical constants and thereby lowering liquidus temperature and improving chemical durability. If the amount of this component is less than 4.5%, these effects cannot be achieved sufficiently whereas if the amount of this component exceeds 7%, the liquidus temperature rises with resulting difficulty in a stable production. Therefore, the lower limit of the amount of this component should preferably be 4.5%, more preferably 5.0% and, most preferably be 5.5% and the upper limit of the amount of this component should preferably be 7.0%, more preferably 6.5% and, most preferably be 6.3%.

$Nb_2O_5$ is very effective for increasing refractive index and lowering liquidus temperature. If the amount of this component is less than 0.1%, these effects cannot be achieved sufficiently whereas if the amount of this component exceeds 3%, Abbe number becomes too small. For achieving these effects easily, therefore, the lower limit of the amount of this component should preferably be 0.1%, more preferably 0.5% and, most preferably be 1.7% and the upper limit of the amount of this component should preferably be 3.0%, more preferably 2.5% and, most preferably be 2.3%.

For achieving high refractive index, low dispersion and low liquidus temperature which are the features of the present invention, the total amount of $Gd_2O_3$ and $Nb_2O_5$ should preferably be less than 10%. Since both of these components are essential components, the lower limit of the total amount of these components should preferably be 5.1%, more preferably 6.0% and, most preferably be 7.0% and the upper limit of the amount of this component should preferably be 25%, more preferably 20% and, most preferably be less than 10%.

As described previously, the inventor of the present invention has found that $Ta_2O_5$, when it coexists with $Nb_2O_5$, is very effective for increasing refractive index and improving stability to devitrification. If the amount of this component is less than 15%, these effects cannot be achieved whereas if the amount of this component exceeds 25%, stability to devitrification is deteriorated rather than is improved. For achieving these effects easily, therefore, the lower limit of the amount of this component should preferably be 15%, more preferably 16% and, most preferably be 18% and the upper limit of the amount of this component should preferably be 25%, more preferably 22% and, most preferably be 20%.

For maintaining a low liquidus temperature which is one of the most important features of the present invention, the lower limit of the total amount of $Ta_2O_5$ and $Nb_2O_5$ should preferably be 16%, more preferably 17% and, most preferably be 18% and the upper limit of the amount of this component should preferably be 28%, more preferably 24% and, most preferably be 23%.

$WO_3$ is effective for adjusting refractive index and, particularly when it coexists with $Li_2O$, for improving stability to devitrification. If the amount of this component exceeds 3%, it becomes difficult to maintain the optical constants within the above described values. The amount of this component should preferably be 2.5% or below, more preferably 2.3% or below and, most preferably be less than 2.0% be within a range from 0.1% to 2.3%. The lower limit of the amount of this component, therefore, should preferably be 0.1% and the upper limit of the amount of this component should preferably be 3%, more preferably 2.5% and, most preferably less than 2.0%. For achieving these effects readily, the lower limit of this component should preferably be 0.1%, more preferably 0.2% and, most preferably be 0.3%. When the refractive index is 1.88 or over, the amount of this component should preferably be less than 0.5%.

$TiO_2$ is effective for adjusting refractive index. If the amount of this component is excessively large, transmittance of the glass is deteriorated. The upper limit of the amount of this component should preferably be 5.0%, more preferably 2.0% and, most preferably be less than 1.0%.

$Y_2O_3$ is effective, like $La_2O_3$, for increasing refractive index and Abbe number of the glass. Addition of an excessively large amount of this component, however, deteriorates stability to devitrification. The upper limit of the amount of this component should preferably be 10%, more preferably 5% and, most preferably be less than 3%.

$Yb_2O_3$ is effective, like $La_2O_3$, for increasing refractive index and Abbe number of the glass. Addition of an excessively large amount of this component, however, deteriorates stability to devitrification. The upper limit of the amount of this component should preferably be 10%, more preferably 5% and, most preferably be less than 3%.

$GeO_2$ is effective for increasing refractive index and improving stability to devitrification. Since this component is expensive, the amount of this component is limited. The upper limit of the amount of this component should preferably be 10%, more preferably 5% and, most preferably be less than 3%.

ZnO is effective for adjusting refractive index, improving stability to devitrification and adjusting glass transition temperature (Tg). If the amount of this component exceeds 10%, stability to devitrification is deteriorated. The lower limit of the amount of this component, therefore, should preferably be 0.5% and the upper limit of the amount of this component should preferably be 10%, more preferably 8% and, most preferably be 7%.

RO where R is one or more elements selected from the group consisting of Mg, Ca, Sr and Ba is effective for adjusting the optical constants of the glass but, if the total amount of RO exceeds 5%, stability to devitrification is deteriorated.

$Sb_2O_3$ has a refining effect in melting of the glass. The amount of this component should preferably be 1% or below.

$Al_2O_3$ may be added up to 5% for improving chemical durability of the glass. In a case where addition of this component is likely to deteriorate stability of the glass, this component should not be added.

If F is added, this component evaporates from the surface of the glass in the preform forming process and is deposited on the surface of a preform and a mold with resulting occurrence of a defect in a lens produced from such preform. Moreover, evaporation of this component causes variation in refractive index and deterioration in chemical durability of the glass. For these reasons, addition of this component is not suitable for stable production of an optical glass for optical elements including lenses. The optical glass of the present invention, therefore, should be free of F except in a case where F is unintentionally mixed as an impurity.

$Cs_2O$ may be added for adjusting the optical constants of the glass. Since, however, this component is expensive, this component should not be added if it is desired to produce an optical glass at a low cost.

$Bi_2O_3$ and $TeO_2$ may be added for increasing refractive index and lowering glass transition temperature (Tg). In a case where addition of these components is likely to cause fogging on the surface of a lens due to evaporation of these components in press molding of the lens, these components preferably should not be added.

Transition metal components such as V, Cr, Mn, Fe, Co, Ni, Cu and Mo excluding Ti absorb wavelengths in a specific part of the visible region and, therefore, addition of these components, even in a very small amount, tend to color the glass. Accordingly, in a case where the optical glass of the present invention uses wavelengths in the visible region, the optical glass should be substantially free of these components.

Pb and Th may be added for increasing refractive index and improving stability of the glass. Cd and Tl may also be added for lowering glass transition temperature (Tg). As may also be added for refining and homogenizing the glass. There is however tendency toward refraining from using Pb, Th, Cd, Tl and As as harmful chemical substance and steps for environmental protection must be taken not only in the glass manufacturing process but also in processing of glass and disposal of glass after production. For this reason, these components preferably should not be added.

Since the glass composition of the present invention is expressed in mass %, it cannot be directly expressed in mol %. A composition expressed in mol % of respective oxides existing in the glass composition satisfying the properties required by the present invention generally assumes the following values. The following expression in mol %, however, is made for convenience of reference and in no way limits the scope of the embodiments of the invention.

| | |
|---|---|
| $SiO_2$ | 8-25 mol % |
| $B_2O_3$ | 18-40 mol % |
| $Li_2O$ | 0-15 mol % |
| $La_2O_3$ | 10-30 mol % |
| $Gd_2O_3$ | 1-10 mol % |
| $ZrO_2$ | 5-10 mol % |
| $Nb_2O_5$ | 0.1-3 mol % |
| $Ta_2O_5$ | 5-10 mol % | where a total amount of $Ta_2O_5+Nb_2O_5$ is 7.5-13 mol %

| | |
|---|---|
| WO$_3$ | 0-3 mol % |
| ZnO | 0-30 mol % |
| RO | 0-5 mol % | where R is one or more elements selected from the group consisting of Mg, Ca, Sr and Ba and/or

| | |
|---|---|
| Sb$_2$O$_3$ | 0-0.3 mol % |

Description will now be made about the properties of the optical glass of the present invention.

It is desirable for glasses and optical elements to have excellent chemical durability. An optical glass having poor chemical durability causes fogging called tarnish on a polished surface of a lens or a free curved surface of a preform. A strict temperature control, therefore, is required for such optical glass which will result in a high cost of production.

When acid-proof property in the Powder Method is Class 3 or over, the above described inconvenience tends to occur. For producing an optical element easily under a simple control system, the acid-proof property should preferably be Class 2 or below and, more preferably, Class 1.

As a glass material used for press molding in the high refractive and low dispersion region, a material having glass transition temperature (Tg) of 670° C. or below is required. A material having a high glass transition temperature (Tg) elevates the press temperature and thereby shortens the life of a mold. For achieving a higher productivity, the glass transition temperature (Tg) should preferably be 630° C. or below.

If the glass transition temperature (Tg) is less than 600° C., chemical durability of the glass tends to be deteriorated. Moreover, glassification of raw materials becomes difficult due to low viscosity. For these reasons, the glass transition temperature (Tg) below 600° C. deteriorates productivity of the glass.

Accordingly, as an optical glass for press molding, the glass transition temperature should preferably be 670° C. or below and, more preferably, be 630° C. or below.

A glass having a high specific gravity increases total weight of an entire lens system and, therefore, preferable specific gravity of the optical glass of the present invention is 5.40 or below. Further, the optical glass of the present invention should preferably be useful for producing a glass preform which can be used for precision press molding. In manufacturing of a glass preform, molten glass is normally caused to flow out of a platinum pipe and drip on a mold for forming. In this case, if a glass having specific gravity which is higher than a predetermined value is used, flow control tends to become difficult. In the optical glass of the present invention, by limiting the value of specific gravity within a specific range in addition to satisfying the optical constants including refractive index, flow control for producing a glass preform is facilitated and accuracy in the size of the product can thereby be improved. For achieving this object, the optical glass of the present invention should more preferably have specific gravity of 5.25 or below and, most preferably, have specific gravity of 5.10 or below. If, however, the optical glass has excessively small specific gravity, there arises a case where the dripping state cannot be achieved even when flow quantity is made small with the result that it becomes difficult to obtain a gob by the dripping method. Therefore, the lower limit of specific gravity of the optical glass of the present invention should preferably be 4.60, more preferably 4.80 and, most preferably 5.00.

Not only in the optical glass of the present invention but in optical glasses generally, when an optical glass is press molded by using a mold, temperature gradient is generated between the inside and outside of a lens in the cooling process. If, at this time, coefficient of thermal expansion of the optical glass is large, a pit tends to be formed in a lens obtained.

Therefore, in the optical glass of the present invention, the upper limit of mean coefficient α of linear thermal expansion at a temperature within a range from 100° C. to 300° C. should preferably be 90×10$^{-7}$/° C., more preferably be 83×10$^{-7}$/° C. and, most preferably be 80×10$^{-7}$/° C.

For realizing a stable production by the manufacturing method to be described below in the optical glass of the present invention, it is important to use a liquidus temperature of 1240° C. or below, preferably 1140° C. or below. By lowering the melting temperature of the glass, energy consumption can be saved and thermal load to the manufacturing apparatus can be mitigated to prevent deterioration of the apparatus and, as a result, the manufacturing cost can be saved and an adverse effect to the environment can be reduced.

As described previously, the optical glass of the present invention can be used as a preform for press molding or, alternatively, can be directly pressed in a molten state. In case it is used as a preform material, the manufacturing method and press molding method are not particularly limited but any known manufacturing method and forming method can be used. As a manufacturing method, for example, the manufacturing method and apparatus for pressed glass products disclosed by Japanese Patent Application Laid-open Publication No. Hei 06-157051 and the manufacturing method and apparatus for an optical glass disclosed by Japanese Patent Application Laid-open Publication No. Hei 11-157849 may be used.

As described above, a preform may be manufactured directly from molten glass or a lens may be obtained directly from a sheet material by cold processing. Alternatively, an optical element may be formed to an intermediate product having a shape resembling a final product by cold processing and then the final product may be obtained by press molding.

Not only in the above described manufacturing method but also in various other forming methods for manufacturing glass (e.g., float method, press forming and draw forming), the factor of viscosity is indispensable. When the temperature of glass is lowered from the molten state of the glass, if the glass is of such as property that crystal is not produced until viscosity of the glass becomes high, the formable range of the glass is expanded and a stable production thereby can be realized. In other words, the higher the viscosity of the glass at liquidus temperature, the more suitable is the glass for a large scale production.

As described previously, in the forming process for producing a preform from molten glass, the value of logarithm log η of viscosity η (dPa·s) must be 0.3 or over. For carrying out stable preform forming in a large scale production, the value of log η at liquidus temperature should preferably be 0.4 or over, more preferably 0.5 or over and, most preferably be 0.6 or over.

EXAMPLES

Tables 1 to 6, 7 and 8 show compositions of Examples No. 1 to No. 28 of the present invention and Comparative Examples No. A to No. F which are optical glasses of the known $SiO_2$— $B_2O_3$— $La_2O_3$—$Gd_2O_3$ glass together with optical constants (nd, vd), glass transition temperature Tg, yield point At, coefficient of linear thermal expansion α and specific gravity of these glasses. The liquidus temperature, viscosity at liquidus temperature and Class according to the acid-proof property (Powder Method) of these glasses are shown in Tables 6 and 8. Further, the compositions of Comparative Examples No. G to No. O are shown in Tables 9 and 11 and optical constants (nd, vd), glass transition temperature Tg, yield point At, coefficient of linear thermal expansions, specific gravity, liquidus temperature and Ra(P) of these glasses are shown in Tables 10 and 12.

For manufacturing the glasses of Examples No. 1 to No. 28, ordinary raw materials for an optical glass including oxides, carbonates and nitrates were weighed and mixed so as to realize the composition ratio of the respective examples shown in Tables 1 to 5. The raw materials were put in a platinum crucible and melted at a temperature within a range from 1300° C. to 1400° C. for two to four hours depending upon the melting property of the composition. After refining and stirring the melt for homogenization, the melt was cast into a mold and annealed and homogeneous glasses were thus provided easily.

Class indicating the acid-proof property "RA(P)" according to the Powder Method was measured in the following manner in accordance with Japanese Optical Glass Industrial Standard:JOGIS06$^{-1975}$ Measuring Method of Chemical Durability of Optical Glass (Powder Method). Glasses of Examples No. 1, No. 5, No. 6, No. 24 No. 25 and No. 27 and Comparative Examples No. A to No. F were crushed to pieces of a particle size within a range from 420 μm to 590 μm and the glass powder specimen thus obtained was put by a specific amount in a platinum dissolution basket. This dissolution basket containing the glass powder specimen was placed in a round-bottom flask made of quartz glass containing 80 ml of 0.01N nitric acid aqueous solution. After treatment in boiling water for 60 minutes, the dissolution basket was taken out of the round-bottom flask and classification was made in the following manner on the basis of initial mass of the glass powder specimen and reduction rate (weight %) calculated from the amount of reduction of the mass. Class 1 indicates a case where the reduction rate (weight %) is less than 0.20%, Class 2 indicates a case where the reduction rate is 0.20%—less than 0.35%, Class 3 indicates a case where the reduction rate is 0.35% to less than 0.65%, Class 4 indicates a case where the reduction rate is 0.65—less than 1.20% and Class 5 indicates a case where the reduction rate is 1.20%—less than 2.20%. In Table 6, therefore, the smaller the value of Class indicating RA(P), the higher the acid-proof property, i.e., chemical durability of the glass.

The mean coefficient of linear thermal expansion α (100° C.-300° C.) was measured in the temperature range from 100° C. to 300° C. in accordance with the measuring method of Japanese Optical Glass Industrial Standard JOGIS 8$^{-2003}$.

For measuring the liquidus temperature, glass in a cullet state was put in a platinum crucible having capacity of 50 ml and held at a predetermined temperature for two hours. Then, the glass was cooled, presence or absence of crystals in the glass was examined and the highest temperature at which a crystal was observed was made the liquidus temperature.

For measuring viscosity η (dPa·s) at liquidus temperature, viscosity at liquidus was measured by using a viscosimeter of a ball-pulling-up type. Viscosity in the present specification is expressed by common logarithm of viscosity η (dPa·s).

TABLE 1

| No. | Examples (mass %) | | | | | |
|---|---|---|---|---|---|---|
| | 1 | 2 | 3 | 4 | 5 | 6 |
| $SiO_2$ | 4.40 | 4.40 | 4.40 | 4.40 | 6.38 | 5.92 |
| $B_2O_3$ | 13.97 | 13.97 | 13.97 | 13.97 | 11.92 | 12.49 |
| $Li_2O$ | | | | | | |
| $La_2O_3$ | 40.03 | 37.03 | 34.03 | 34.03 | 40.10 | 40.49 |
| $Gd_2O_3$ | 15.80 | 15.80 | 15.80 | 11.80 | 15.36 | 15.46 |
| $ZrO_2$ | 6.00 | 6.00 | 6.00 | 6.00 | 5.99 | 6.02 |
| $Nb_2O_5$ | 1.00 | 1.00 | 1.00 | 1.00 | 1.00 | 1.00 |
| $Ta_2O_5$ | 18.70 | 18.70 | 18.70 | 18.70 | 18.65 | 17.62 |
| $Gd_2O_3$ + $Nb_2O_5$ | 16.80 | 16.80 | 16.80 | 12.80 | 16.36 | 16.46 |
| $Nb_2O_5$ + $Ta_2O_5$ | 19.70 | 19.70 | 19.70 | 19.70 | 19.65 | 18.62 |
| ZnO | | 3.00 | 6.00 | 10.00 | | 0.65 |
| $WO_3$ | | | | | | |
| $TiO_2$ | | | | | | 0.25 |
| SnO | | | | | 0.50 | |
| $Sb_2O_3$ | 0.10 | 0.10 | 0.10 | 0.10 | 0.10 | 0.10 |
| Total | 100 | 100 | 100 | 100 | 100 | 100 |
| nd | 1.8817 | 1.8776 | 1.8736 | 1.8697 | 1.8830 | 1.8830 |
| vd | 40.9 | 40.8 | 40.7 | 40.4 | 40.8 | 40.8 |
| Tg (° C.) | 714 | 692 | 672 | 646 | 738 | 719 |
| At (° C.) | 743 | 724 | 703 | 687 | 765 | 758 |
| α ($10^{-7}$/° C.) | 79 | 77 | 76 | 75 | 78 | 81 |
| Specific gravity | 5.50 | 5.46 | 5.43 | 5.36 | 5.52 | 5.48 |

TABLE 2

| No. | Examples (mass %) | | | | | |
|---|---|---|---|---|---|---|
| | 7 | 8 | 9 | 10 | 11 | 12 |
| $SiO_2$ | 4.40 | 7.40 | 7.40 | 8.40 | 7.40 | 5.40 |
| $B_2O_3$ | 13.97 | 10.97 | 10.97 | 9.97 | 10.97 | 12.97 |
| $Li_2O$ | 1.00 | 1.00 | 1.50 | 1.50 | 2.00 | 2.00 |
| $La_2O_3$ | 39.03 | 39.03 | 38.53 | 38.53 | 38.03 | 38.03 |
| $Gd_2O_3$ | 15.80 | 15.80 | 15.80 | 15.80 | 15.80 | 15.80 |
| $ZrO_2$ | 6.00 | 6.00 | 6.00 | 6.00 | 6.00 | 6.00 |
| $Nb_2O_5$ | 1.00 | 1.00 | 1.00 | 1.00 | 1.00 | 1.00 |
| $Ta_2O_5$ | 18.70 | 18.70 | 18.70 | 18.70 | 18.70 | 18.70 |
| $Gd_2O_3 + Nb_2O_5$ | 16.80 | 16.80 | 16.80 | 16.80 | 16.80 | 16.80 |
| $Nb_2O_5 + Ta_2O_5$ | 19.70 | 19.70 | 19.70 | 19.70 | 19.70 | 19.70 |
| SnO | | | | | | |
| $WO_3$ | | | | | | |
| $GeO_2$ | | | | | | |
| $Y_2O_3$ | | | | | | |
| $Sb_2O_3$ | 0.10 | 0.10 | 0.10 | 0.10 | 0.10 | 0.10 |
| Total | 100 | 100 | 100 | 100 | 100 | 100 |
| nd | 1.8718 | 1.8715 | 1.8666 | 1.8670 | 1.8641 | 1.8612 |
| vd | 41.2 | 41.0 | 41.2 | 41.1 | 41.2 | 41.3 |
| Tg (° C.) | 652 | 670 | 630 | 635 | 590 | 575 |
| At (° C.) | 697 | 718 | 680 | 682 | 642 | 621 |
| α ($10^{-7}$/° C.) | 83 | 82 | 84 | 84 | 90 | 92 |
| Specific gravity | 5.34 | 5.35 | 5.34 | 5.35 | 5.29 | 5.27 |

TABLE 3

| No. | Examples (mass %) | | | | | |
|---|---|---|---|---|---|---|
| | 13 | 14 | 15 | 16 | 17 | 18 |
| $SiO_2$ | 6.00 | 6.40 | 5.35 | 6.40 | 6.40 | 6.40 |
| $B_2O_3$ | 9.90 | 10.37 | 11.52 | 9.97 | 13.00 | 14.00 |
| $Li_2O$ | 1.50 | 1.50 | 1.00 | 1.50 | 1.50 | 1.50 |
| $La_2O_3$ | 38.53 | 38.53 | 38.03 | 35.53 | 37.90 | 34.90 |
| $Gd_2O_3$ | 15.80 | 15.80 | 13.80 | 15.80 | 10.00 | 10.00 |
| $ZrO_2$ | 6.00 | 6.00 | 6.00 | 6.00 | 6.00 | 6.00 |
| $Nb_2O_5$ | 1.00 | 1.00 | 2.00 | 1.00 | 1.00 | 3.00 |
| $Ta_2O_5$ | 16.70 | 20.30 | 19.20 | 18.70 | 18.70 | 18.70 |
| $Gd_2O_3 + Nb_2O_5$ | 16.80 | 16.80 | 16.80 | 16.80 | 11.00 | 13.00 |
| $Nb_2O_5 + Ta_2O_5$ | 19.70 | 21.30 | 19.70 | 19.70 | 19.70 | 21.70 |
| ZnO | 4.47 | | 3.00 | 2.00 | 5.40 | 5.40 |
| $WO_3$ | | | | | | |
| $Cs_2O$ | | | | 3.00 | | |
| $Sb_2O_3$ | 0.10 | 0.10 | 0.10 | 0.10 | 0.10 | 0.10 |
| Total | 100 | 100 | 100 | 100 | 100 | 100 |
| nd | 1.8765 | 1.8805 | 1.8832 | 1.88266 | 1.8541 | 1.8531 |
| vd | 40.4 | 40.3 | 40.1 | 40.2 | 41.2 | 40.2 |
| Tg (° C.) | 625 | 650 | 621 | 625 | 606 | 603 |
| At (° C.) | 680 | 702 | 675 | 683 | 648 | 652 |
| α ($10^{-7}$/° C.) | 90 | 88 | 91 | 92 | 84 | 81 |
| Specific gravity | 5.42 | 5.47 | 5.43 | 5.49 | 5.43 | 5.21 |

TABLE 4

| No. | Examples (mass %) | | | | | |
|---|---|---|---|---|---|---|
| | 19 | 20 | 21 | 22 | 23 | 24 |
| $SiO_2$ | 6.40 | 6.40 | 6.40 | 6.40 | 6.40 | 5.40 |
| $B_2O_3$ | 14.50 | 14.50 | 14.00 | 14.00 | 14.50 | 15.50 |
| $Li_2O$ | 1.50 | 1.50 | 1.50 | 1.50 | 1.00 | 1.00 |
| $La_2O_3$ | 34.40 | 33.60 | 33.60 | 36.60 | 36.60 | 36.60 |
| $Gd_2O_3$ | 10.00 | 10.00 | 10.00 | 7.00 | 7.00 | 7.00 |
| $ZrO_2$ | 6.00 | 6.00 | 6.00 | 6.00 | 6.00 | 6.00 |

TABLE 4-continued

| | Examples (mass %) | | | | | |
|---|---|---|---|---|---|---|
| No. | 19 | 20 | 21 | 22 | 23 | 24 |
| $Nb_2O_5$ | 3.00 | 3.00 | 2.00 | 2.00 | 2.00 | 2.00 |
| $Ta_2O_5$ | 18.70 | 19.50 | 19.50 | 19.50 | 19.50 | 19.50 |
| $Gd_2O_3$ + $Nb_2O_5$ | 13.00 | 13.00 | 12.00 | 12.00 | 9.00 | 9.00 |
| $Nb_2O_5$ + $Ta_2O_5$ | 21.70 | 22.50 | 21.50 | 21.50 | 21.50 | 21.50 |
| ZnO | 5.40 | 5.40 | 5.40 | 5.40 | 5.40 | 5.40 |
| $WO_3$ | | 1.50 | 1.50 | 1.50 | 1.50 | 1.50 |
| $Sb_2O_3$ | 0.10 | 0.10 | 0.10 | 0.10 | 0.10 | 0.10 |
| Total | 100 | 100 | 100 | 100 | 100 | 100 |
| nd | 1.8490 | 1.84940 | 1.8509 | 1.85196 | 1.8524 | 1.8527 |
| vd | 40.4 | 40.2 | 40.1 | 40.1 | 40.1 | 40.2 |
| Tg (° C.) | 600 | 597 | 598 | 600 | 612 | 614 |
| At (° C.) | 642 | 638 | 630 | 648 | 663 | 661 |
| α ($10^{-7}$/° C.) | 82 | 82 | 84 | 78 | 78 | 76 |
| Specific gravity | 5.04 | 5.04 | 5.04 | 5.04 | 5.09 | 5.07 |

TABLE 5

| | Examples (mass %) | | | |
|---|---|---|---|---|
| No. | 25 | 26 | 27 | 28 |
| $SiO_2$ | 5.40 | 5.37 | 5.29 | 5.40 |
| $B_2O_3$ | 15.50 | 15.42 | 15.20 | 15.50 |
| $Li_2O$ | 1.00 | 1.00 | 0.98 | 1.00 |
| $La_2O_3$ | 37.60 | 37.41 | 36.87 | 38.60 |
| $Gd_2O_3$ | 7.00 | 6.97 | 6.86 | 7.00 |
| $ZrO_2$ | 6.00 | 5.97 | 5.88 | 6.00 |
| $Nb_2O_5$ | 2.00 | 1.99 | 1.96 | 2.00 |
| $Ta_2O_5$ | 18.50 | 18.41 | 18.14 | 17.50 |
| $Gd_2O_3$ + $Nb_2O_5$ | 9.00 | 8.96 | 8.82 | 9.00 |
| $Nb_2O_5$ + $Ta_2O_5$ | 20.50 | 20.40 | 20.10 | 19.50 |
| ZnO | 5.40 | 5.37 | 5.29 | 5.40 |
| $WO_3$ | 1.50 | 1.49 | 1.47 | 1.50 |
| $GeO_2$ | | 0.50 | 1.96 | |
| $Sb_2O_3$ | 0.10 | 0.10 | 0.10 | 0.10 |
| Total | 100 | 100 | 100 | 100 |
| nd | 1.8524 | 1.8517 | 1.8497 | 1.8518 |
| vd | 40.4 | 40.4 | 40.4 | 40.7 |
| Tg (° C.) | 605 | 614 | 614 | 611 |
| At (° C.) | 656 | 657 | 657 | 659 |
| α ($10^{-7}$/° C.) | 76 | 77 | 79 | 78 |
| Specific gravity | 5.08 | 5.07 | 5.01 | 5.11 |

TABLE 6

| | Examples (mass %) | | | | | |
|---|---|---|---|---|---|---|
| No. | 1 | 5 | 6 | 24 | 25 | 27 |
| Liquidus temperature (° C.) | 1240 | 1230 | 1230 | 1090 | 1080 | 1070 |

TABLE 6-continued

| | Examples (mass %) | | | | | |
|---|---|---|---|---|---|---|
| No. | 1 | 5 | 6 | 24 | 25 | 27 |
| Viscosity (dPa · s) in liquidus temperature | 0.72 | 0.75 | 0.80 | 0.85 | 0.92 | 0.98 |
| RA (P) | 1 | 1 | 1 | 2 | 2 | 2 |

TABLE 7

| | Comparative Examples (mass %) | | | | | |
|---|---|---|---|---|---|---|
| No. | A | B | C | D | E | F |
| $SiO_2$ | 5.00 | 1.00 | 7.00 | 6.00 | 7.30 | 6.27 |
| $B_2O_3$ | 23.20 | 26.10 | 9.00 | 14.00 | 8.40 | 11.27 |
| $Li_2O$ | 1.00 | | 0.30 | 0.20 | 0.60 | 1.25 |
| $La_2O_3$ | 35.20 | 38.13 | 46.00 | 25.00 | 47.80 | 27.21 |
| $Gd_2O_3$ | 13.15 | 13.15 | 5.00 | 30.00 | 10.00 | 30.27 |
| $ZrO_2$ | 6.00 | 7.40 | 6.00 | 5.00 | 5.20 | 3.22 |
| $Nb_2O_5$ | 7.75 | 7.75 | | | 0.80 | |
| $Ta_2O_5$ | | | 19.00 | 15.00 | 14.90 | 10.37 |
| $Gd_2O_3$ + $Nb_2O_5$ | 20.90 | 20.90 | 5.00 | 30.00 | 10.80 | 30.27 |
| $Nb_2O_5$ + $Ta_2O_5$ | 7.75 | 7.75 | 19.00 | 15.00 | 15.70 | 10.37 |
| ZnO | 4.08 | 3.85 | | | 2.20 | 7.65 |
| CaO | | | 1.00 | | | |
| $WO_3$ | | | 2.00 | 5.00 | | |
| $Al_2O_3$ | | | | | 2.60 | |
| $Y_2O_3$ | 5.65 | 2.65 | 3.00 | | | |
| $TiO_2$ | | | | | | 2.50 |
| $Ge_2O$ | | | | 2.00 | | |
| $Sb_2O_3$ | | | | | 0.20 | |
| Total | 100 | 100 | 100 | 100 | 100 | 100 |

TABLE 8

| | Comparative Examples | | | | | |
|---|---|---|---|---|---|---|
| No. | A | B | C | D | E | F |
| nd | 1.8182 | 1.8291 | 1.8851 | 1.8575 | 1.8805 | 1.8578 |
| vd | 43.4 | 43.1 | 40.3 | 41.3 | 40.8 | 40.3 |
| Tg (° C.) | 658 | 652 | 720 | 680 | 692 | 589 |
| At (° C.) | | | | | | 645 |
| α ($10^{-7}$/° C.) | | | | | | |
| Specific gravity | | | | | | 5.38 |

TABLE 8-continued

| | Comparative Examples | | | | | |
|---|---|---|---|---|---|---|
| No. | A | B | C | D | E | F |
| Liquidus temperature (° C.) | 1120 | 1120 | 1260 | 1260 | 1290 | 1270 |
| RA (P) | 3 | 3 | 2 | 2 | 2 | 2 |

TABLE 9

| | Comparative Examples (mass %) | | | | | |
|---|---|---|---|---|---|---|
| No. | G | H | I | J | K | L |
| $SiO_2$ | 7.3 | 7.3 | 7.3 | 6.7 | 6.7 | 7.3 |
| $B_2O_3$ | 9.4 | 7.6 | 9.4 | 10.8 | 10.8 | 8.4 |
| $Li_2O$ | 0 | 0 | 0 | 0 | 0.2 | 0 |
| $La_2O_3$ | 55.8 | 41.6 | 45.8 | 41.2 | 41.8 | 37.8 |
| $Gd_2O_3$ | 0 | 10 | 10 | 10 | 9.6 | 18 |
| $ZrO_2$ | 5.2 | 5.2 | 7.2 | 5.2 | 5.2 | 5.2 |
| $Nb_2O_5$ | 0.8 | 0.8 | 1.2 | 0.8 | 1.3 | 0 |
| $Ta_2O_5$ | 15.9 | 15.9 | 13.9 | 15.9 | 15.9 | 13.9 |
| $Gd_2O_3 + Nb_2O_5$ | 0.8 | 10.8 | 11.2 | 10.8 | 10.9 | 18.0 |
| $Nb_2O_5 + Ta_2O_5$ | 16.7 | 16.7 | 15.1 | 16.7 | 16.9 | 13.9 |
| ZnO | 5 | 11 | 5 | 3.2 | 4.5 | 4.5 |
| CaO | | | | | | |
| $WO_3$ | | | | | | 1.8 |
| $Al_2O_3$ | 0.4 | 0.4 | 0 | 0 | 0 | 1.9 |
| $Y_2O_3$ | 0 | 0 | 0 | 6 | 3.8 | 0 |
| $Bi_2O_3$ | 0 | 0 | 0 | 0 | 0 | 1 |
| $Sb_2O_3$ | 0.2 | 0.2 | 0.2 | 0.2 | 0.2 | 0.2 |
| Total | 100 | 100 | 100 | 100 | 100 | 100 |

TABLE 10

| | Comparative Examples | | | | | |
|---|---|---|---|---|---|---|
| No. | G | H | I | J | K | L |
| nd | 1.89 | 1.90 | 1.89 | 1.88 | 1.88 | 1.88 |
| vd | 40.8 | 40.8 | 39.6 | 40.7 | 41.2 | 40.9 |
| Tg (° C.) | 692 | 699 | 689 | 697 | 699 | 672 |
| At (° C.) | | | | | | |
| $\alpha$ $(10^{-7}/°C.)$ | | | | | | |
| Specific gravity | | | | | | |
| Liquidus temperature (° C.) | 1280 | 1290 | 1260 | 1260 | 1250 | 1290 |
| RA (P) | | | | | | |

TABLE 11

| | Comparative Examples (mass %) | | |
|---|---|---|---|
| No. | M | N | O |
| $SiO_2$ | 8.3 | 5.9 | 6.7 |
| $B_2O_3$ | 9.2 | 12.6 | 9.7 |
| $Li_2O$ | | | |
| $La_2O_3$ | 47.2 | 41.2 | 42.5 |
| $Gd_2O_3$ | 10.0 | 11.0 | 10.0 |
| $ZrO_2$ | 4.2 | 5.4 | 5.2 |
| $Nb_2O_5$ | 0.8 | 0.60 | 0.8 |
| $Ta_2O_5$ | 16.9 | 15.9 | 15.9 |
| $Gd_2O_3 + Nb_2O_5$ | 10.8 | 11.6 | 10.8 |
| $Nb_2O_5 + Ta_2O_5$ | 17.7 | 16.5 | 16.7 |
| ZnO | 3.2 | 0 | 3.2 |
| BaO | | | 0.3 |
| $WO_3$ | | | |

TABLE 11-continued

| | Comparative Examples (mass %) | | |
|---|---|---|---|
| No. | M | N | O |
| $Yb_2O_3$ | | 2.0 | |
| $Y_2O_3$ | 0 | 5.0 | 4.0 |
| $TiO_2$ | | | |
| $Ge_2O$ | 0 | 0 | 1.5 |
| $Sb_2O_3$ | 0.2 | 0.2 | 0.2 |
| Total | 100 | 100 | 100 |

TABLE 12

| | Comparative Examples | | |
|---|---|---|---|
| No. | M | N | O |
| nd | 1.88 | 1.88 | 1.88 |
| vd | 41.0 | 41.2 | 41.1 |
| Tg (° C.) | 713 | 708 | 707 |
| At (° C.) | | | |
| $\alpha$ $(10^{-7}/°C.)$ | | | |
| Specific gravity | | | |
| Liquidus tenperature (° C.) | 1270 | 1280 | 1290 |
| RA (P) | | | |

As shown in Tables 1 to 5, the optical glasses of the examples (No. 1 to No. 28) of the present invention all have a refractive index (nd) and Abbe number (vd) within the desired ranges. As shown in Table 6, the acid-proof property according to the Powder Method of these examples is all Class 2 or Class 1 indicating that they have excellent chemical durability. Accordingly, these glasses have excellent chemical durability and low devitrification temperature while maintaining the desired refractive index and hence can be expected to have excellent productivity.

As Comparative Examples No. A and No. B, examples described in Japanese Patent Application Laid-open Publication No. 2002-284452 have been adopted. The glasses of Comparative Examples No. A and No. B do not satisfy the composition range or the optical properties required by the present invention. Neither are these glasses sufficient in chemical durability. Therefore, these glasses are not suitable for an optical glass.

As Comparative Examples No. C and No. D, examples having a relatively large Abbe number among those described in Japanese Patent Application Laid-open Publication No. Sho 54-90218 have been adopted. These glasses do not satisfy the composition range required by the present invention and, moreover, have a high devitrification temperature. These glasses, therefore, are not suitable for an optical glass.

As Comparative Examples No. E and No. F, examples of Japanese Patent Application Laid-open Publication No. 2001-348244 and Japanese Patent Application Laid-open Publication No. 2003-267748 have been adopted. These glasses do not satisfy the composition range required by the present invention and have a high liquidus temperature, These glasses, therefore, are not suitable for a large scale production.

As Comparative Examples No. G to No. O, Examples 2 to 10 of Japanese Patent Application Laid-open Publication No. 2001-348244 have been adopted.

Since the glass composition of the present invention does not contain F, it is advantageous in adjusting refractive index in the manufacturing process. This advantage will now be described.

The optical glasses of Examples No. 6, No. 19 and No. 25 were melted in the same manner as described above by subjecting the optical glasses to heat treatment at 1300° C. for 2 hours, 8 hours and 24 hours. The same heat treatment was applied to optical glasses No. P, No. Q and No. R which were modifications of these examples in which 2 mass parts of F was added to the compositions of these examples which respectively had 100 mass parts calculated on oxide basis. Variation in refractive index with time of these optical glasses is shown in Table 13.

TABLE 13

| | Examples | | | | | |
|---|---|---|---|---|---|---|
| No. | 6 | 19 | 25 | P | Q | R |
| nd(2 h) | 1.8833 | 1.8495 | 1.8526 | 1.8683 | 1.8350 | 1.8370 |
| nd(8 h) | 1.8833 | 1.8495 | 1.8526 | 1.8705 | 1.8380 | 1.8391 |
| nd(24 h) | 1.8834 | 1.8495 | 1.8527 | 1.8759 | 1.8420 | 1.8440 |

As shown in Table 13, in the optical glasses of Examples No. 6, No. 19 and No. 25, amount of variation in the refractive index after lapse of 24 hours is 0.0001 or below. On the other hand, in the optical glasses of No. P, No. Q and No. R, amount of variation in the refractive index after lapse of 24 hours is 0.006 or over. The range of refractive index normally required for an optical element is ±0.0005. As a result, it has been found that the glass composition containing no F component is advantageous over the glass composition containing F component in manufacturing of an optical glass used for an optical element.

In sum, the optical glass of the present invention contains $SiO_2$, $B_2O_3$, $La_2O_3$ and $Gd_2O_3$, have a refractive index within a range from 1.85 to 1.90 and an Abbe number within a range from 40 to 42, have excellent chemical durability and stability to devitrification and, moreover, it is possible to easily provide an optical glass having a low glass transition temperature without deteriorating these properties. The optical glass of the present invention, therefore, enables forming of a preform easily by the known methods, regardless of whether the preform is one for a spherical lens or one for an aspherical lens and regardless of whether the known method is the manufacturing method by polishing or the manufacturing method using press molding.

Since the optical glass of the present invention has high-refractive index and low dispersion property, high chemical durability and low expansion property, it can be applied to optical elements other than a lens such as a diffraction grating and a prism. Further, since the optical glass of the present invention has a very small photoelastic constant in addition to the above described properties, it can be applied to purposes such as a projector for which birefringence becomes a problem in an environment in which mechanical or thermal stress tends to be produced.

Further, since the optical glass of the present invention has a high Young's modulus, it can be applied to various substrates by utilizing its low expansion property.

What is claimed is:

1. An optical glass comprising $SiO_2$, in an amount of 9 mass % or below, $B_2O_3$ and $La_2O_3$ in an amount of 50 mass % or below, $Li_2O$ in an amount of 0.5% or over and one or more oxides selected from the group consisting of $ZrO_2$, $Nb_2O_5$ and $Ta_2O_5$, where the total amount of $Gd_2O_3+Nb_2O_5$ is less than 10 mass %, said optical glass having a refractive index of 1.85 or over and an Abbe number of 35 or over, having a glass transition temperature (Tg) of 630° C. or below and being free of F.

2. An optical glass as defined in claim 1 wherein liquidus temperature is 1240° C. or below.

3. An optical glass as defined in claim 1 wherein liquidus temperature is 1140° C. or below.

4. An optical glass as defined in claim 1 wherein acid-proof property of glass measured in accordance with Japanese Optical Glass Industrial Standard JOGIS 06[-1999] "Measuring Method of Chemical Durability of Optical Glass (Powder Method)" is Class 2 or below.

5. An optical glass as defined in claim 1 having a specific gravity within a range from 4.80 to 5.25.

6. An optical glass as defined in claim 1 wherein a total amount of $Ta_2O_5+Nb_2O_5$ is 18-28%.

7. An optical glass as defined in claim 1 comprising $TiO_2$ in an amount of less than 5% and $Al_2O_3$ in an amount of less than 5%.

8. An optical glass as defined in claim 1 wherein logarithm log η of viscosity η(dPa·s) at liquidus temperature is 0.3 or over.

9. A glass preform for press molding made of an optical glass as defined in claim 1.

10. An optical element formed by press molding the glass preform for press molding as defined in claim 9.

11. An optical element made of an optical glass as defined in claim 1.

12. An optical glass as defined in claim 1, wherein the optical glass is free of both $GeO_2$ and $TiO_2$.

13. An optical glass having a glass transition temperature (Tg) of 630° C. or below comprising, in mass % calculated on oxide basis,

| $SiO_2$ | 2-9% and/or |
|---|---|
| $B_2O_3$ | 8.0-less than 18% and/or |
| $La_2O_3$ | 33-50% and/or |
| $Gd_2O_3$ | 3-20% and/or |
| $ZrO_2$ | 4.5-7% and/or |
| $Nb_2O_5$ | 0.1-3% and/or |
| $Ta_2O_5$ | 15-25% | where a total amount of $Ta_2O_5+Nb_2O_5$ is 17-28% and

| $Li_2O$ | 0-3% and/or |
|---|---|
| ZnO | 0-10% and/or |
| RO | 0-5% | where R is one or more elements selected from the group consisting of Mg, Ca, Sr and Ba and/or

| $Sb_2O_3$ | 0-1% |
|---|---| being free of F and having a refractive index within a range from 1.88 to 1.90 and comprising $WO_3$ in an amount of less than 0.5% in mass % on oxide basis.

14. An optical glass as defined in claim 13 wherein a total amount of $Ta_2O_5+Nb_2O_5$ is 18-23%.

15. An optical glass as defined in claim 13 having Abbe number within a range from 40 to 42.

16. An optical glass as defined in claim 13 comprising, in mass % calculated on oxide basis,

| | |
|---|---|
| $B_2O_3$ | 15-17% and |
| $Gd_2O_3$ | 3-9.5% | wherein a total amount of $Gd_2O_3+Nb_2O_5$ is less than 10%.

17. An optical glass as defined in claim 13 wherein acid-proof property of glass measured in accordance with Japanese Optical Glass Industrial Standard JOGIS 06$^{-1999}$ "Measuring Method of Chemical Durability of Optical Glass (Powder Method)" is Class 2 or below.

18. An optical glass as defined in claim 13 wherein acid-proof property of glass measured in accordance with Japanese Optical Glass Industrial Standard JOGIS 06$^{-1999}$ "Measuring Method of Chemical Durability of Optical Glass (Powder Method)" is Class 1.

19. An optical glass as defined in claim 13 wherein liquidus temperature is 1240° C. or below.

20. An optical glass as defined in claim 13 wherein liquidus temperature is 1140° C. or below.

21. An optical glass as defined in claim 13 having a specific gravity within a range from 4.80 to 5.25.

22. An optical glass as defined in claim 13, wherein the optical glass is free of both $GeO_2$ and $TiO_2$.

23. An optical glass having a glass transition temperature (Tg) of 630° C. or below comprising, in mass % calculated on oxide basis,

| | |
|---|---|
| $SiO_2$ | 3-9% |
| $B_2O_3$ | 9.5-less than 18% |
| $La_2O_3$ | 33-45% |
| $Gd_2O_3$ | 3-18% |
| $ZrO_2$ | 5-7% |
| $Nb_2O_5$ | 0.1-3% and |
| $Ta_2O_5$ | 15-25% | where a total amount of $Ta_2O_5+Nb_2O_5$ is 16-28% and

| | |
|---|---|
| $Li_2O$ | 0-3% and/or |
| ZnO | 0-10% and/or |
| RO | 0-5% | where R is one or more elements selected from the group consisting of Mg, Ca, Sr and Ba and/or

| | |
|---|---|
| $Sb_2O_3$ | 0-1% | being free of F and having a refractive index within a range from 1.88 to 1.90 and comprising $WO_3$ in an amount of less than 0.5% in mass % on oxide basis.

24. An optical glass as defined in claim 23, wherein the optical glass is free of both $GeO_2$ and $TiO_2$.

\* \* \* \* \*